(12) United States Patent
Persson

(10) Patent No.: US 10,427,274 B2
(45) Date of Patent: Oct. 1, 2019

(54) GRINDING LIQUID TROUGH ARRANGEMENT

(71) Applicant: Tormek AB, Lindesberg (SE)

(72) Inventor: Håkan Persson, Lindesberg (SE)

(73) Assignee: Tormek AB, Lindesberg (SE)

( * ) Notice: Subject to any disclaimer, the term of this patent is extended or adjusted under 35 U.S.C. 154(b) by 274 days.

(21) Appl. No.: 15/298,072

(22) Filed: Oct. 19, 2016

(65) Prior Publication Data

US 2017/0113323 A1 Apr. 27, 2017

(30) Foreign Application Priority Data

Oct. 21, 2015 (SE) ...................................... 1551357

(51) Int. Cl.
| | |
|---|---|
| B24B 55/02 | (2006.01) |
| B24B 27/02 | (2006.01) |
| B24B 53/007 | (2006.01) |
| B24B 55/03 | (2006.01) |
| B24B 3/36 | (2006.01) |
| B03C 1/033 | (2006.01) |
| B03C 1/28 | (2006.01) |

(52) U.S. Cl.
CPC ............ *B24B 55/02* (2013.01); *B03C 1/0332* (2013.01); *B03C 1/288* (2013.01); *B24B 3/36* (2013.01); *B24B 27/02* (2013.01); *B24B 53/007* (2013.01); *B24B 55/03* (2013.01); *B03C 2201/18* (2013.01)

(58) Field of Classification Search
CPC ... B03C 1/0332; B03C 1/288; B03C 2201/18; B24B 27/02; B24B 53/007; B24B 55/02
See application file for complete search history.

(56) References Cited

U.S. PATENT DOCUMENTS

| | | | | |
|---|---|---|---|---|
| 2,549,529 A | * | 4/1951 | Sandlin ................... | B24B 55/06 |
| | | | | 451/453 |
| 5,525,095 A | * | 6/1996 | Baughman .............. | B24B 27/02 |
| | | | | 125/11.03 |

(Continued)

FOREIGN PATENT DOCUMENTS

| | | |
|---|---|---|
| CN | 204584976 U | 8/2015 |
| EP | 2883655 A1 | 6/2015 |
| JP | 4298787 B1 | 7/2009 |

OTHER PUBLICATIONS

Office Action for Swedish Application No. 1551357-5, dated Apr. 27, 2016.

(Continued)

*Primary Examiner* — Timothy V Eley
(74) *Attorney, Agent, or Firm* — Merchant & Gould P.C.

(57) ABSTRACT

A grinding liquid trough arrangement for a grinding machine having a grindstone, wherein said grinding liquid trough arrangement comprises: a trough for grinding liquid formed by a trough wall, wherein the trough is configured to be arranged at a grinding machine having a grindstone such that the trough encloses a portion of a grindstone, wherein, the trough wall comprises at least one metal element which is attractable to magnets, and that, the grinding liquid trough arrangement comprises at least one magnetic element which is configured to be detachable attached to an external side of the trough wall by means of magnetic attraction between the magnetic element and the metal element.

9 Claims, 2 Drawing Sheets

(56) References Cited

U.S. PATENT DOCUMENTS

2003/0110570 A1* 6/2003 Gringer ............... B23D 71/04
                                                                               7/100
2016/0016241 A1* 1/2016 Taylor ............... B23D 45/062
                                                                               83/100

OTHER PUBLICATIONS

Search Report for European Patent Application No. 16193287.6, dated Jul. 5, 2017.

* cited by examiner

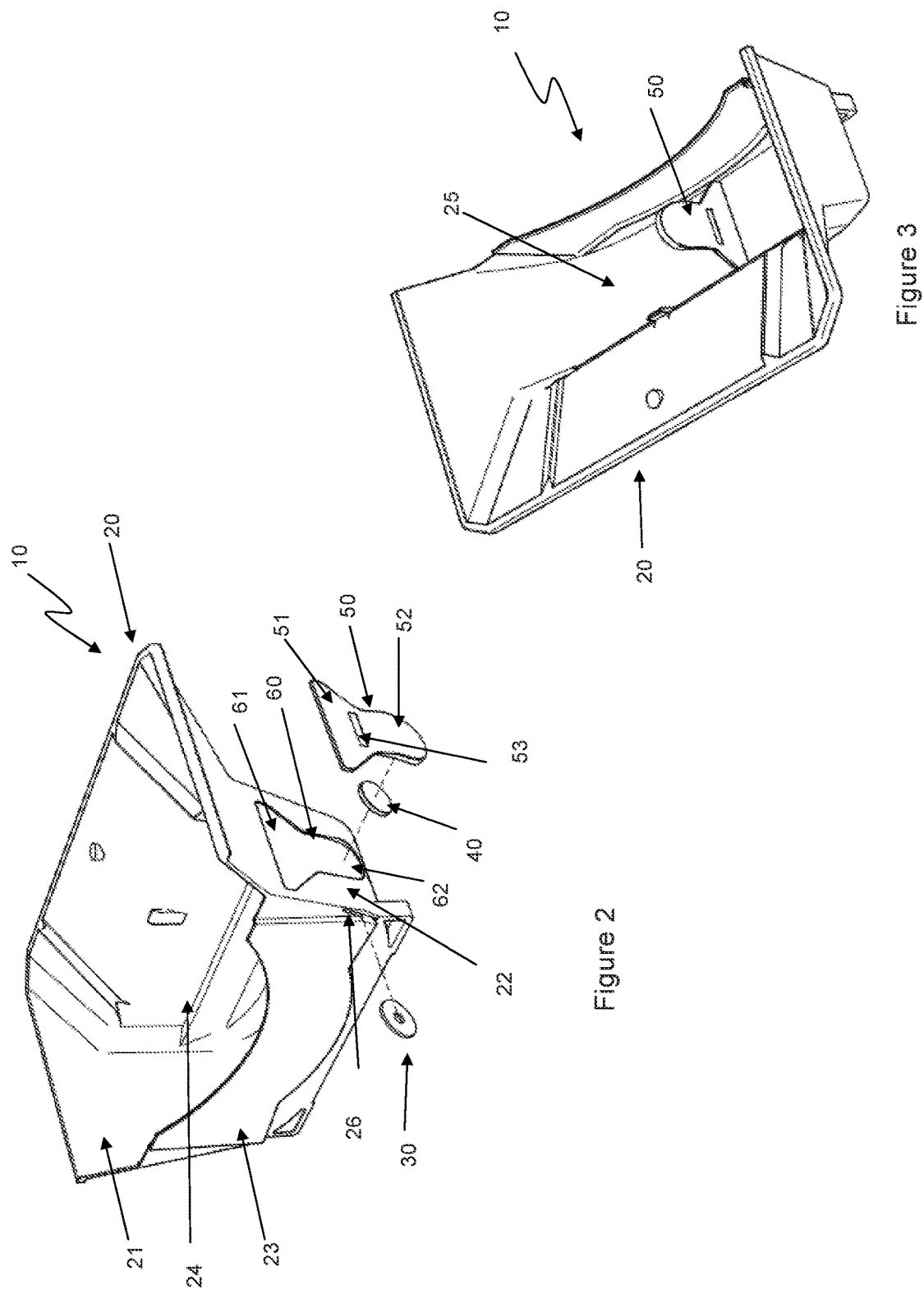

GRINDING LIQUID TROUGH ARRANGEMENT

This application claims benefit of Serial No. 1551357-5, filed 21 Oct. 2015 in Sweden, which application is incorporated herein by reference. To the extent appropriate, a claim of priority is made to each of the above disclosed application.

TECHNICAL FIELD

The present disclosure relates to a grinding liquid trough arrangement for a grinding machine having a rotational grindstone. The present disclosure further relates to a trough for grinding liquid and to a scraper for collecting particles from the bottom of a grinding liquid trough.

BACKGROUND ART

Grinding or sharpening of edged tools, such as handheld knives or wood working tools such as plane irons, wood chisels or spoke shave blades may be performed in a bench type grinding machine comprising a motor driven rotational grindstone. During sharpening, the edged tool is held with a correct angle in contact with the grindstone and is moved across the grindstone by an operator until sufficiently sharpened. To cool the edged tool during sharpening, the grindstone is wetted with grinding liquid. For this purpose the grinding machine comprises a trough for the grinding liquid, typically water, arranged underneath the grindstone.

A problem related grinding machines of the aforementioned type is to handle the small steel particles that are ground from the blade during sharpening. These particles accumulate in the grinding liquid during grinding and may as a consequence therefore slowly be incorporated into the surface of the grindstone over time.

This problem has been addressed in the past.

EP2883655A1 shows a grinding machine of the bench which is provided with a grinding jig for holding a knife in proper position against the grindstone during grinding. To collect steel particles ground from the edge of the knife, the grinding jig comprises a magnet.

Attempts have also been made remove steel particles from the grinding liquid by incorporating a magnet in the trough for grinding liquid. However, while this solution has proven useful it is often found cumbersome and time consuming to clean the grinding liquid trough from steel particles after use of the grinding machine.

Thus, it is an object of the present disclosure to provide a grinding liquid trough arrangement for a grinding machine which solves or at least mitigates one of the aforementioned problems. In particular it is an object of the present disclosure to provide a grinding liquid trough arrangement for a grinding machine which allows for simple cleaning of the trough for grinding liquid. Moreover, it is an object of the present disclosure to provide a grinding liquid trough arrangement for a grinding machine which allows for complete and through cleaning of the grinding liquid trough with a minimum of manual labor.

SUMMARY OF THE INVENTION

According to the present disclosure at least one of these objects is met by a grinding liquid trough arrangement 10 for a grinding machine 100 having a grindstone 104 which is arranged to be rotated in a direction of rotation, wherein said grinding liquid trough arrangement 10 comprises:

a trough 20 for grinding liquid formed by a trough wall 21, 22, 23, 24, 25, wherein the trough 20 is configured to be arranged at a grinding machine 100 having a grindstone 104 such that the trough 20 encloses a portion of a grindstone 104, characterized in that the trough wall 21, 22, 23, 24, 25 comprises at least one metal element 30 which is attractable to magnets, and that, the grinding liquid trough arrangement 10 comprises at least one magnetic element 40 which is configured to be detachable attached to an external side of the trough wall 21, 22, 23, 24, 25 by means of magnetic attraction between the magnetic element 40 and the metal element 30.

During grinding, the magnetic element may be attached to the external surface of the trough for grinding liquid by magnetic attraction to the metal element comprised in the trough wall. This will have the effect that magnetism is lead from the magnetic element to the metal element and through the wall of the trough for grinding liquid. The steel particles produced during grinding will therefore be attracted to the magnetized area of the trough for grinding liquid and adhere to the inner surface of the trough.

After completed grinding, the detachable magnetic element may be removed from the external trough wall which in turn results in that the steel particles fall down onto the bottom of the trough since no magnetism now acts on the trough. The steel particles thereby gather in a neat pile on the bottom of the trough and may easily be collected and removed by the user of the grinding machine.

Preferably, said at least one metal element 30 comprises iron or ferritic steel.

Preferably, the magnetic element 40 is a permanent magnet.

The trough wall may comprise a bottom wall 25 and a circumferential wall 21, 22, 23, 24, wherein said at least one metal element 30 is arranged in the circumferential wall 21, 22, 23, 24, close to the bottom wall 25.

It is preferred to arrange the metal element close to the bottom of the trough since the concentration of the relatively heavy steel particles in the grinding liquid is large at the bottom of the trough.

The circumferential wall 21, 22, 23, 24 may comprise a first side wall 23 configured to face a grinding machine 100 and opposite front and rear walls 21, 22 extending from the first side wall 23, wherein said at least one metal element 30 is arranged in the front wall 21 or the rear wall 22.

It is preferred to arrange the metal element in either of the front or rear wall since steel particles will be transported by the grindstone to the front wall and by the flow in the grinding liquid to the rear wall.

Preferably, the trough 20 for grinding liquid is configured to be attached to a grinding machine 100 such that the first side wall 23 faces the grinding machine and such that the front wall 21 is positioned in a direction of rotation of a grindstone 101 of the grinding machine 100, whereby said at least one metal element 30 is arranged in the rear wall 22.

It is preferred to arrange the metal element in the rear trough wall which, with respect to the direction of rotation, is behind the grindstone since the rotation of the grindstone will cause the grinding liquid to flow from the front wall towards the rear wall of the trough. The steel particles will follow the flow of the grinding liquid and collect at the rear wall of the trough from grinding liquid.

Preferably the grinding liquid trough arrangement 10 comprising a scraper 50 for collecting particles from the trough 20 for grinding liquid, said scraper 50 having a scraping portion 51 and a handle portion 52, wherein the handle portion 52 may comprise the magnetic element 40.

A scraper is a preferred tool for removing the steel particles from the trough for grinding liquid, since the tight contact between the scraping portion of the scraper and the bottom of the trough allows for complete removal of particles. By arranging the magnetic element in the handle portion of the scraper it is avoided that the steel particles adhere to the scraping portion, thereby making it easy the wipe the steel particles of the scraper after use. The combination of scraper and magnet is further very advantageous because by necessity the scraper is held in place at the trough during grinding. This minimizes the risk of the scraper getting lost between use thereof.

The trough wall 21, 22, 23, 24, 25 may comprise a recess 60 for receiving the scraper 50, wherein the shape of the recess 60 corresponds to the shape of the scraper 50 and comprises a scraping shaped portion 61 and a handle shaped portion 62, whereby the metal element 30 is arranged in the through wall 21, 22, 23, 24, 25, in the handle shaped portion 62 of the recess 60.

It is thereby ensured that the magnetic element always is in correct position with respect to the metal element in the though wall.

Preferably, the recess 60 for receiving the scraper is configured such that the handle shaped portion 62 is close to a bottom wall 25 of the trough 20 for grinding liquid.

A second aspect of the present disclosure is a trough 20 for grinding liquid for a grinding machine 100 having a grindstone 104 which is rotational in a direction of rotation, wherein said trough 20 is formed by a trough wall 21, 22, 23, 24, 25 and configured to be arranged at a grinding machine 100 having a grindstone 104 such that the trough 20 encloses a portion of a grindstone 104 characterized in that the trough wall 21, 22, 23, 24, 25 comprises at least one metal element 30 that is attractable to magnets.

Preferably, the through wall 21, 22, 23, 24, 25 comprises a recess 60 for receiving the scraper 50, wherein the shape of the recess 60 corresponds to the shape of the scraper 50 and comprises a scraping shaped portion 61 and a handle shaped portion 62, whereby the metal alley element 30 is arranged in the through wall 21, 22, 23, 24, 25, in the handle shaped portion 62 of the recess 60.

A third aspect of the present disclosure is a scraper 50 for collecting particles from a trough 20 for grinding liquid having a bottom wall 23, wherein said scraper 50 comprises:

a scraping portion 51, configured to collect particles from the bottom wall 23 of the trough 20 by scraping and;

a handle portion 52 for allowing a operator to grip the scraper 50, wherein the handle portion 52 of the scraper comprises a magnetic element 40.

A fourth aspect of the present disclosure is a grinding machine 100 comprising a grindstone 104 which is rotational in a direction of rotation and a motor for rotating the grindstone and a grinding liquid trough arrangement 10 according to the first aspect of the disclosure.

BRIEF DESCRIPTION OF THE DRAWINGS

FIG. 2: A schematically drawing of a grinding liquid trough arrangement according to the present disclosure in a perspective exploded side view.

FIG. 3: A schematically drawing of a grinding liquid trough arrangement according to the present disclosure during cleaning of the trough.

DETAILED DESCRIPTION OF EMBODIMENTS

Figure 1:
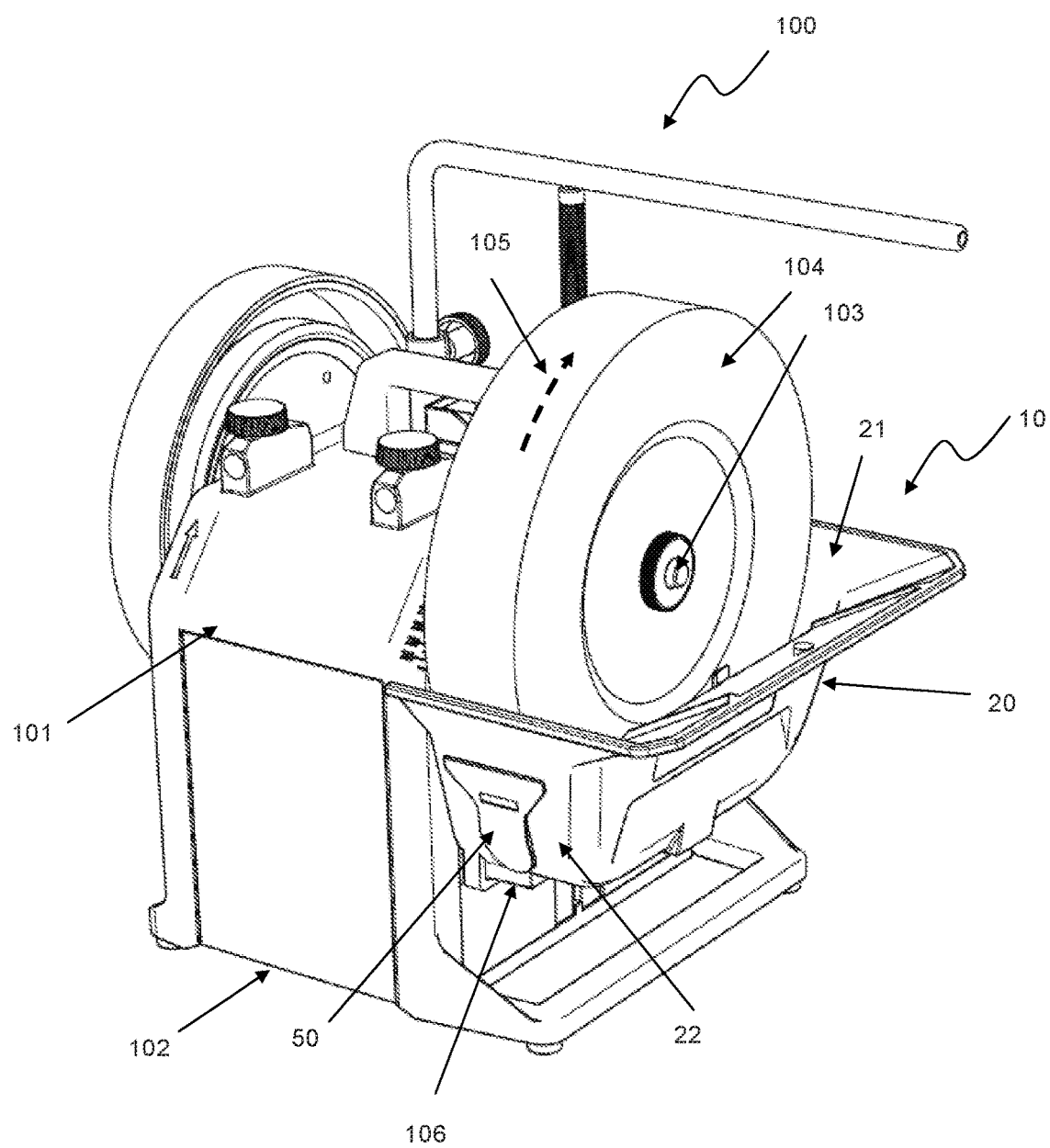
FIG. 1: A schematically drawing of a grinding machine comprising a grinding liquid trough arrangement according to the present disclosure.

The grinding liquid trough arrangement according to the present disclosure will now be described more fully hereinafter. The grinding liquid trough arrangement according to the present disclosure may however be embodied in many different forms and should not be construed as limited to the embodiments set forth herein. Rather, these embodiments are provided by way of example so that this disclosure will be thorough and complete, and will fully convey the scope of the present disclosure to those persons skilled in the art. Like reference numbers refer to like elements throughout the description.

FIG. 1 shows schematically a grinding machine 100 comprising a grinding liquid trough arrangement 10 according to a first preferred embodiment of the present disclosure. The grinding machine 100 is of the bench type, i.e. it is of a design that allows it to be placed on a table in a workshop and to be operated manually by a person. The grinding machine 100 comprises a housing 101. The housing has a plane base 102 on which the grinding machine is supported. The grinding machine comprises a shaft 103 which is rotated by an electrical motor (not shown) enclosed in the housing 101. The shaft 103 is provided to hold and rotate a grindstone 104 against which tools or blades are ground or sharpened. The grindstone is arranged to be rotated in a direction of rotation which is indicated by the dashed arrow 105. In FIG. 1 the direction of rotation in clockwise. However, alternatively the grindstone 104 may be arranged to be rotated in opposite direction, i.e. counter clockwise.

The grinding machine 100 comprises a grinding liquid trough arrangement 10 according to the present disclosure. The grinding liquid trough arrangement 10 comprises a trough 20 for grinding liquid which is formed by, i.e. comprises, a bottom wall and a circumferential wall such that the trough, when arranged on the grinding machine 100 partially may enclose the grindstone 104. The purpose of the trough 20 is to contain grinding liquid (not shown) to wet the grindstone. The trough 20 for grinding liquid is arranged to be mounted on, and dismounted, from the grinding machine 100. The trough 200 and the grinding machine 100 may therefore be provided with attachments (not shown) for hanging the trough 20 onto the grinding machine. The trough 20 may also be supported at the grinding machine 100 on support bars 106 extending from the side of the grinding machine.

The grinding liquid trough arrangement 10 according to the present disclosure will in the following be described with reference to the exploded view shown FIG. 3.

The trough 20 has an elongated rectangular shape and comprises a circumferential wall formed by opposite first and second side walls 23, 24 and opposite rear and front end walls 21, 22. The first side wall 23 is configured to be supported against the side of a grinding machine when the trough 20 is in mounted state and the second side wall 24 faces away from a grinding machine when the trough is mounted state. The rear end wall 22 and the front end wall 21 extend respectively between the first and second side walls 23, 24. The trough 20 also comprises a bottom wall 25 which is obscured by the first side wall 23. The circumferential wall 21, 22, 23, 24 and the bottom wall 25 constitute the trough wall 21, 22, 23, 24, 25.

It is obvious that the trough 20 may have other forms than the rectangular shape described above as long as the trough may be mounted on grinding machine to partially enclose and wet a grindstone.

The trough is typically made of plastic material, such as ABS or PP.

According to the disclosure, the trough wall comprises a metal element 30 which is attracted to magnets. That is, the metal element 30 comprises, or consists, of a pure metal or a metal alloy which in the presence of the magnetic field from a magnet will be drawn to the magnet. Typically, such metals or alloys are ferromagnetic materials. Typical examples of suitable materials are iron or ferritic steels, such as stainless ferritic steels. It is appreciated that the metal element itself is not magnetized.

The metal element 30 may be in any suitable form, for example a metal plate such a washer as shown in FIG. 2.

Preferably, the metal element 30 is incorporated in the trough wall 21, 22, 23, 24, 25. The metal element may thereby be embedded into the trough wall during casting of the trough 20 by so called "cast-in". Alternatively, the trough wall may comprise a slot 26 which allows the metal element to be inserted into the trough wall. It is also possible to attach the metal element onto the trough wall, for example by gluing or welding. However, to protect the metal element from corrosion and to ensure a smooth trough wall which is easy to clean it is preferred to arrange the metal element such that is fully enclosed within the trough wall.

The position at which the metal element 30 is arranged in the trough wall 21, 22, 23, 24, 25 depends on the design of the trough 20. However, it is preferred to arrange the metal element 30 in a position in the trough wall where the concentration of metal particles in the grinding liquid is high during grinding. Preferably, the metal element 30 it therefore arranged in the circumferential wall 21, 22, 23, 24 of the trough 20 and close to the bottom 25 of the trough 20. By "close to the bottom 25" is meant that the metal element 30 may be arranged in a position adjacent to the bottom 20 or in a position on half of the height of the circumferential wall or anywhere between these positions. For example, the metal element 30 may be arranged in a position on a quarter of the height of the circumferential wall. The metal element 30 may also be arranged in the bottom 25 of the trough 20.

It is preferred that the metal element 30 is arranged on one of the front- or rear end walls 21, 22 of the trough 20. When arranging the metal element 30 in the trough wall, consideration is preferably given to the direction of rotation of the grindstone since the rotating grindstone creates a flow of grinding liquid from an end wall positioned in the direction of rotation towards the opposite end wall. Retuning to FIG. 1, the front end wall 21 is positioned in the direction of rotation 105 of the grindstone and the flow of grinding liquid is therefore directed towards the rear end wall 22. Since the flow of grinding liquid carries metal particles towards the rear end wall 22 it is favorable to arrange the metal element in the rear end wall 22. Obviously, if the grindstone rotates in opposite direction, i.e. counter clockwise, it is favorable to arrange the metal element 30 in the front end wall 21.

The grinding liquid trough arrangement 10 further comprises a magnetic element 40, which is configured to be attached to an external surface of the trough wall by magnetic attraction to the metal element 30 in the trough wall 21, 22, 23, 24, 25. The magnetic element 40 may further be detached, i.e. removed from the external side of the trough wall. Attaching and detaching of the magnetic element 40 is preformed by hand of the user of the grinding liquid trough arrangement.

Typically the magnetic element 40 is a permanent magnet having a magnetic field of such magnitude, i.e. strength, that the magnetic element 40 may be firmly attached on the external side of the trough wall 21, 22, 23, 24, 25. The magnetic field is further of such magnitude that the field extends through the metal element 30 to the internal side of the trough wall to attract metal particles in a grinding liquid and cause these to collect and adhere to the internal side of the trough wall.

The magnetic element 40 may have any suitable form. For example, it has the same shape and dimensions as the metal element 30. It may also have a contour corresponding to external side of the trough wall 21, 22, 23, 24, 25.

The grinding liquid trough arrangement 10 according to the present disclosure may also include a scraper 50. The scraper 50 comprises a scraping portion 51 which is adopted to collect particles from the bottom 25 of the trough 20 by scraping. Thereby it is preferred that the width of the scraping portion 51 of the scraper corresponds to the width of the bottom 25 of the trough 20. A handle portion 52 is provided to allow a user to hold the scraper 50 by hand during scraping.

The magnetic element 40 may be arranged in the scraper 50. Preferably the magnetic element 40 is thereby arranged in the handle portion 52 of the scraper. Typically, the magnetic element 40 is thereby embedded into to the handle portion 52 of the scraper.

The trough 20 may comprise a recess 60 with a shape corresponding to the shape of the scraper 50, i.e. having a handle shaped portion 62 and a scraper shaped portion 61. The depth of the recess 60 typically corresponds to the thickness of the scraper. When the scraper 50 is not in used for scraping it may be placed in the recess 60.

Preferably the metal element 30 is arranged in the trough wall 21, 22, 23, 24, 25 such that it is positioned in the handle shaped portion 62 of the recess 60. The recess 60 is thereby designed such that the handle shaped portion 62 is close to the bottom 25 of the trough 20. The scraper handle portion 52 may thereby comprise the magnetic element 40. This arrangement ensures that the scraper 50 is secured from being displaced when not used for scraping and at the same time it is ensured that the magnetic element 40 are in correct position with regards to the metal element 30.

FIG. 4 shows the scraper 50 in a cleaning operation in which the scraper 50 removes particles from the bottom 25 of trough 20.

Although a particular embodiment has been disclosed in detail this has been done for purpose of illustration only, and is not intended to be limiting. In particular it is contemplated that various substitutions, alterations and modifications may be made within the scope of the appended claims.

For example, it is possible to arrange further metal elements 30 than one in the trough wall 21, 22, 23, 24, 25. It is thereby also possible to include more than one magnetic element 40 in grinding liquid trough arrangement 10 according to the disclosure.

Moreover, although specific terms may be employed herein, they are used in a generic and descriptive sense only and not for purposes of limitation. Furthermore, as used herein, the terms "comprise/comprises" or "include/includes" do not exclude the presence of other elements. Finally, reference signs in the claims are provided merely as a clarifying example and should not be construed as limiting the scope of the claims in any way.

The invention claimed is:

1. A grinding liquid trough arrangement for a grinding machine having a grindstone which is arranged to be rotated in a direction of rotation, wherein said grinding liquid trough arrangement comprises:
   a trough for grinding liquid formed by a trough wall, wherein the trough is configured to be arranged at a grinding machine having a grindstone such that the trough encloses a portion of a grindstone, wherein the trough wall comprises at least one metal element which is attractable to magnets, and wherein the grinding liquid trough arrangement comprises at least one magnetic element which is configured to be detachably attached to an external side of the trough wall by means of magnetic attraction between the magnetic element and the metal element.

2. The grinding liquid trough arrangement according to claim 1, wherein said at least one metal element comprises iron or ferritic steel.

3. The grinding liquid trough arrangement according to claim 1, wherein the magnetic element is a permanent magnet.

4. The grinding liquid trough arrangement according to claim 1, wherein the trough wall comprises a bottom wall and a circumferential wall, and wherein said at least one metal element is arranged in the circumferential wall, close to the bottom wall.

5. The grinding liquid trough arrangement according to claim 4, wherein the circumferential wall comprises a first side wall configured to face a grinding machine and opposite front and rear walls extending from the first side wall, and wherein said at least one metal element is arranged in the front wall or the rear wall.

6. The grinding liquid trough arrangement according to claim 5, wherein the trough for grinding liquid is configured to be attached to a grinding machine such that the first side wall faces the grinding machine and that the front wall is positioned in a direction of rotation of a grindstone of the grinding machine, and wherein said at least one metal element is arranged in the rear wall.

7. The grinding liquid trough arrangement according to claim 1, comprising a scraper for collecting particles from the trough for grinding liquid, said scraper having a scraping portion and a handle portion, wherein the handle portion comprises the magnetic element.

8. The grinding liquid trough arrangement according to claim 7, wherein the trough wall comprises a recess for receiving the scraper, wherein the shape of the recess corresponds to the shape of the scraper and comprises a scraping shaped portion and a handle shaped portion, and wherein the metal element is arranged in the trough wall in the handle shaped portion of the recess.

9. The grinding liquid trough arrangement according to claim 8, wherein the recess for receiving the scraper is configured such that the handle shaped portion is close to a bottom wall of the trough for grinding liquid.

\* \* \* \* \*